United States Patent [19]

Hirose

[11] Patent Number: 4,958,116
[45] Date of Patent: Sep. 18, 1990

[54] METHOD FOR CONTROLLING AC INDUCTION MOTOR

[75] Inventor: Kenji Hirose, Aichi, Japan

[73] Assignee: Mitsubishi Denki Kabushiki Kaisha, Tokyo, Japan

[21] Appl. No.: 621,765

[22] Filed: Jun. 18, 1984

[51] Int. Cl.$^5$ .............................................. H02P 5/40
[52] U.S. Cl. .................................... 318/800; 318/805
[58] Field of Search ........................ 318/803, 800, 805

[56] References Cited

U.S. PATENT DOCUMENTS

| | | | |
|---|---|---|---|
| 4,456,868 | 6/1984 | Yamamura et al. | 318/800 |
| 4,467,262 | 8/1984 | Curtiss | 318/811 |
| 4,484,128 | 11/1984 | Jotten et al. | 318/803 |

OTHER PUBLICATIONS

Abbovdanti, A., "Method of Flux Control Induction Motors Driven by Variable Frequency, Variable Voltage Supplies" Rel. p.t.o. July 6, 1981.

Blaschke, Felix, "The Principle of Field Orientation as Applied to the New Transvektor Closed-Loop Control System for Rotating-Field Machines," Siemens *Review*, vol. XXXIX, No. 5, pp. 217–220, (1972).

Yamamura, S. and Nakagawa, S., "Equivalent Circuit and Field Acceleration Method of A-C Servomotor by Means of Induction Motor," *Trans. B., IEEE of Japan*, vol. 102-B, p. 439 (1982).

*Primary Examiner*—David Smith, Jr.
*Attorney, Agent, or Firm*—Sughrue, Mion, Zinn, Macpeak & Seas

[57] ABSTRACT

A method for controlling an AC induction motor in such a manner that the same degree of control as can be exerted on a DC motor is effected without requiring the use of a flux sensor or coordinate transformations. With reference to an asymmetrical-T type equivalent circuit of the AC induction motor, the input current or voltage to the stator coils of the motor is controlled so that an exciting current has a constant amplitude and continuous phase upon an abrupt change in an input torque instruction. It is demonstrated that this method produces essentially the same control as for a DC motor while methods based upon other equivalent circuits do not.

1 Claim, 3 Drawing Sheets

METHOD FOR CONTROLLING AC INDUCTION MOTOR

BACKGROUND OF THE INVENTION

The present invention relates to a method for controlling an AC induction motor. More particularly, the invention relates to a method for controlling an AC induction motor whereby the motor is controlled so as to make the torque response of the AC induction motor behave substantially the same as a DC motor.

A method for controlling an AC induction motor which enables the motor to be controlled in such a manner has been described by F. Blaschke, "The Principle of Field Orientation as Applied to the New TRANSVEKTOR Closed-Loop Control System for Rotating-Field Machines", Siemens Review, Vol. XXXIX, No. 5, pp. 217-220 (1972). With reference to FIG. 1, the basic principle of field oriented control is to control both the phase and the amplitude of the stator current so that the field component of the current remains constant and the torque component is controlled according to the torque command. In such a control method, the three-phase stator currents are transformed into a D-Q reference frame which is rotating at an angular speed $\omega$, that is, at the frequency of the applied power source. In FIG. 1, $\vec{I_D}$ is termed the field component current, and $\vec{I_Q}$ the torque component current. If $|I_D|$ is held constant and $\vec{I_Q}$ controlled in accordance with the torque command, the induction motor can be controlled so as to operate in the same manner as an armature-controlled DC motor with a fixed field oxcitation. The d-q coordinate system in FIG. 1 is fixed respect to the stator; that is, the d-q coordinate system is a stationary reference coordinate system.

FIG. 2 is a block diagram showing how the field oriented control method can be implemented. The control system receives as inputs a torque command T* and a flux command $\phi$*. From these values and from a value $\vec{I_f}$ derived from the sensed flux $\Psi$ in the rotor gap of the motor 30, a current command calculator 10 calculates values of $I_d$* and $I_q$*, where the asterisks indicate command values. In this diagram, $L_2$ represents the self inductance of the rotor of the motor 30, $r_2$ the resistance of the rotor and $L_m$ the magnetization inductance of the motor. From $I_D$* and $I_Q$*, a transform from the D-Q (rotating) to the d-q (fixed) coordinate system is effected utilizing the value of $\vec{I_f}$ calculated from the sensed flux $\Psi$. A second transform from the d-q coordinate system to the three-phase a-b-c system is then effected to derive values of $i_a$*, $i_b$* and $i_c$* representing the three-phase currents flowing in the stator windings of the motor. To drive the motor 30 with voltages, the current commands $i_a$*, $i_b$* and $i_c$* are changed by an inverter 20 into voltages $v_a$, $v_b$ and $v_c$ which are applied to the stator coils of the motor 30.

Although this scheme is successful in attaining the desired object of driving an AC induction motor so that the output torque behavior is similar to that of a separately excited DC motor, the implementation required therefor is complex and costly. Specifically, it is difficult to provide a flux sensor inside the motor, as the scheme unavoidably requires. Also, two separate transforms are required: that from the D-Q coordinate system to the d-q system and that from the d-q system to the a-b-c system, which transforms are complex to implement and time consuming to execute in operation.

Accordingly, it is desirable to provide a method for controlling an AC induction motor in which no flux sensor is required in the motor and which can be implemented in a manner simpler than that required for field oriented control as described above, specifically, without the need for coordinate transforms as required for field oriented control.

It has been reported by S. Yamamura and S. Nakagawa in "Equivalent Circuit and Field Acceleration Method of A-C Servomotor by Means of Induction Motor", Trans. B. IEE of Japan, Vol. 102-B, p. 439 (1982) that, with respect to a single-phase equivalent circuit of an induction motor, if an input voltage $\vec{V_1}$ is controlled in such a manner that an exciting current $\vec{I_0}$ is held constant in amplitude and continuous in phase when a transient occurs in an input torque command T*, then there will be no torque transient and the motor can be controlled so as to provide a torque response similar to that of a separately excited DC motor. This paper gives several different equivalent circuits of AC induction motors, including a symmetrical-T type, an asymmetrical -T-I type, an asymmetrical-T-II type and an L type, which are all well known per se from other studies. The paper concludes that this principle is generally applicable to all of these equivalent circuits. The Yamamura and Nakagawa paper does not, however, disclose any way of implementing a control system for an AC induction motor which operates using this principle. Moreover, the paper offers no proof of the assertion that, for all the different equivalent circuits given, if the exciting current is controlled in the manner described, there will be no torque transient and the motor can be controlled so as to provide a torque response the same as that of a separately secited DC motor.

Thus, it is a further object of the present invention to determine for which if any of the different equivalent circuits disclosed by Yamamura and Nakagawa the assertion of controllability in the manner of a DC motor is true and to provide a method for implementing control of an AC induction motor accordingly.

SUMMARY OF THE INVENTION

After conducting research to determine which of the equivalent circuit types discussed above yields, when actually implemented in a control system, a system which provides for control of an AC induction motor in the same manner as a DC motor, the present applicant has discovered that only the asymmetrical-T type equivalent circuit is capable of yielding the desired results. All others result in large and unacceptable transients in the torque output following an abrupt change in an input torque command so that, in those cases, the motor cannot be controlled in the manner of a DC motor.

Accordingly, the present invention provides a method for controlling an AC induction motor in the manner of a DC motor wherein an input voltage or current is controlled so that, with respect to an exciting current in an asymmetrical-T type equivalent circuit of the AC motor, the exciting current is of constant amplitude and continuous in phase at the time of an abrupt change in an input torque command.

More specifically, control of an input voltage or current is effected such that, in a single-phase equivalent circuit of the AC induction motor consisting of first and second input terminals, a first resistance having a first terminal coupled to the first input terminal, a first inductance having a first terminal coupled to a second terminal of the first resistance, a second inductance having a first terminal coupled to a second terminal of the first inductance and a second terminal coupled to the second input terminal, and a second resistance having a first terminal coupled to the second terminal of the first inductance and a second terminal coupled to the second input terminal, the input voltage applied between the first and second input terminals or the current flowing between the first and second input terminals is controlled so that, when an abrupt change in an input torque command occurs, the amplitude of a current flowing through the second inductance is maintained constant and the phase of the current flowing through the second inductance is continuous.

Yet more specifically, the invention provides a method for controlling an AC induction motor in the manner of a DC motor through an inverter and in response to an input torque command, which AC induction motor is initially operating with conditions of a torque comand of $T_1$, a slip frequency of $\omega_{S1}$, an exciting current of $\vec{I_0}$, a stator current amplitude of $\vec{I_1}$, a stator current angle of $\theta_1$, and a rotor angular speed of $\omega_r$, comprising the steps of:

(a) reading a new torque command $T_2$;

(b) computing a new rotor angular speed $\omega_{S2}$ as:

$$\omega_{S2} = \frac{2r'_2}{3PL'^2_m I_0^2} T_2,$$

where $r'_2 = x_m^2 r_2/x_2^2$, $r_2$ is the resistance of the rotor of the AC inductance motor, P indicates the number of pole pairs of the motor, and $L_m'$ is a magnetizing inductance of the motor defined by $j\omega L_m' = x_m' = x_m^2/x_2$, where $\omega$ is the angular frequency of the applied voltage, $x_m$ is the magnetizing reactance of the rotor, and $x_2$ is the self reactance of the rotor;

(c) computing a new stator current amplitude $I_2$ as:

$$I_2 = \frac{r'^2_2 + (\omega_{S2} L_m')^2}{r'^2_2} I_0;$$

(d) computing a new stator current angle $\theta_2$ as:

$$\theta_2 = \theta_1 + \tan^{-1}\frac{\omega_{S2} L_m'}{r'_2} - \tan^{-1}\frac{\omega_{S1} L_m'}{r'_2};$$

(e) computing a phase angle $\theta$ as:

$$\theta = (\omega_r + \omega_{S2})\Delta T + \theta_2,$$

where $\Delta T$ is a time interval from a time when the stator phase angle is $\theta_1$ until new current instruction values are applied to the inverter;

(f) computing the new current instruction values as:

$$i_a^* = \sqrt{2} I_2 \cdot \sin \theta,$$

$$i_b^* = \sqrt{2} I_2 \cdot \sin (\theta - 2\pi/3), \text{ and}$$

$$i_b^* = \sqrt{2} I_2 \cdot \sin (\theta - 4\pi/3); \text{ and}$$

(e) applying the new current instruction values to the inverter to drive the motor.

DESCRIPTION OF THE PREFERRED EMBODIMENTS

The invention will now be explained in detail with reference to FIGS. 3 through 5 of the drawings.

As mentioned above, the invention is based on the fact that in a control method in which the amplitude and phase of the exciting current in an equivalent circuit of the AC induction motor are controlled, only the asymmetrical-T type equivalent circuit is capable of producing control in the same manner as a DC motor.

Figure 3:
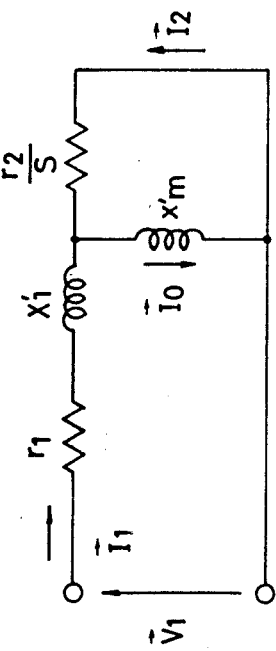
FIG. 3 is a single-phase equivalent circuit diagram of an AC induction motor used in the practice of the invention.
Figure 2:
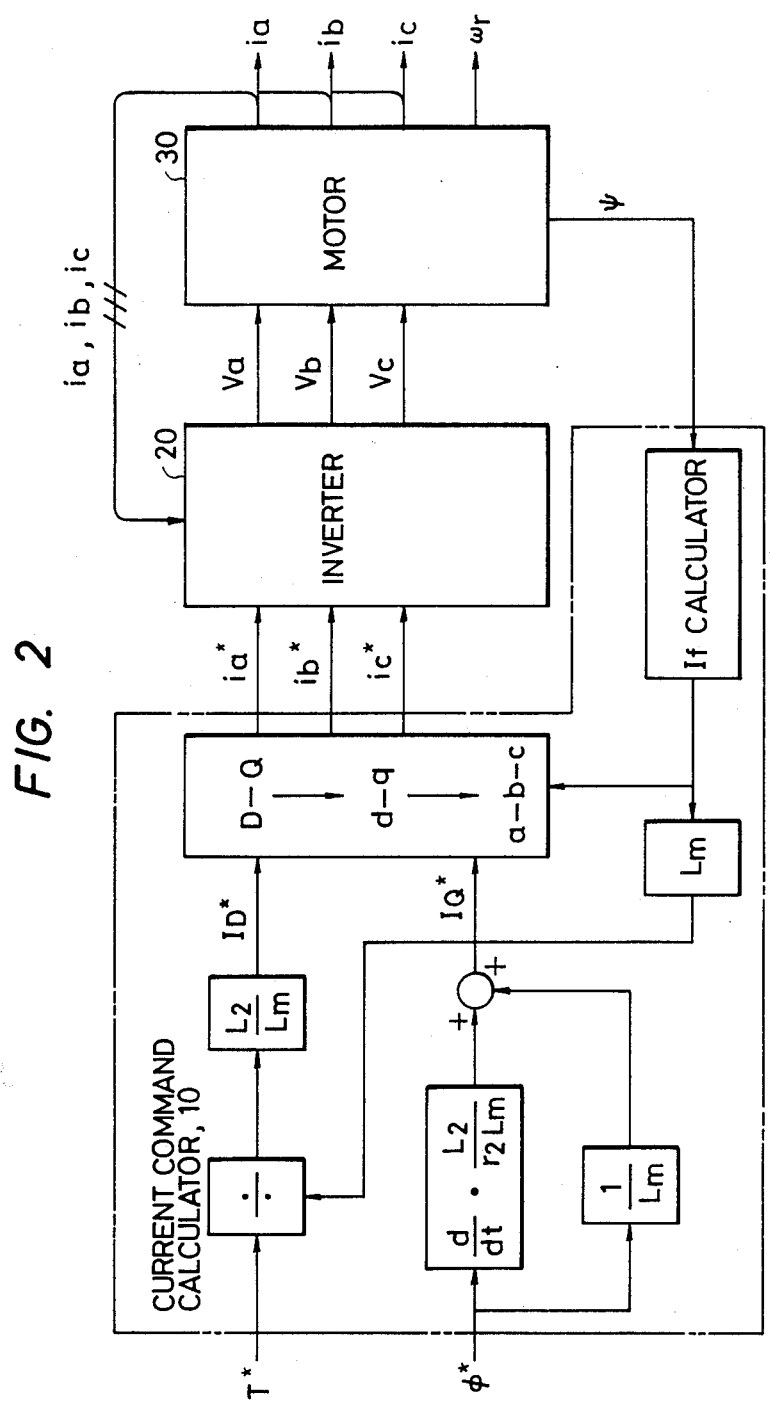
FIG. 2 is a block diagram showing a prior art control system for an AC induction motor.

FIG. 3 shows the single-phase asymmetrical-T type equivalent circuit of an induction motor. The following definitions apply to the diagram of FIG. 3:

$$x_1' \stackrel{\Delta}{=} x_1 - \frac{x_m^2}{x_2},$$

$$x_m' \stackrel{\Delta}{=} \frac{x_m^2}{x_2}, \text{ and}$$

$$r_2' \stackrel{\Delta}{=} \frac{x_m^2}{x_2^2} r_2.$$

In the above equations, $x_1$ represents the self reactance of the stator, $x_2$ the self reactance of the rotor, $x_m$ the magnetizing reactance, $r_2$ the rotor resistance, and S the slip of the motor.

The relationship between $\vec{I_1}$ and $\vec{I_0}$ is given by:

$$\vec{I_0} = \frac{1}{1 + \frac{jSx_m'}{r_2'}} \vec{I_1},$$

and the torque T is given by:

$$T = \frac{3P(Sx_m')^2}{\omega S r_2'} I_0^2,$$

where S is the slip of the motor and P the number of pole pairs of the motor.

In accordance with the invention, by controlling $\vec{I_1}$ so that the magnitude of $\vec{I_0}$ is maintained constant and the phase of $\vec{I_0}$ is continuous when there is an abrupt change in the applied torque instruction, there is no torque transient, and hence the motor can be controlled so as to provide a torque response the same as that of a DC motor.

The following equation must hold if the torque transient is to be eliminated:

$$\frac{1}{1 + \frac{jS_1 x_m'}{r_2'}} I_1 e^{j\theta_1} = \frac{1}{1 + \frac{jS_2 x_m'}{r_2'}} I_2 e^{j\theta_2},$$

where $S_1$ is the slip for the previous torque command $T_1$ ($t=0-$), $S_2$ is the slip for the new torque command $T_2$ ($t=0+$), $I_1$ is the stator current amplitude at $t=0-$, $I_2$ is the stator current amplitude at $t=0+$, $\theta_1$ is defined as $\int(\omega_r+\omega_{S1})dt=(\omega_r+\omega_{S1})\Delta T$ where $\Delta T$ is the total computation time equal to the time from $t=0$ until the new current commands are issued, and $\theta_2$ is the angle of the stator current at $t=0+$. The left side of the above equation represents conditions immediately before $t=0$ and the right side immediately after $t=0$. This equation may be rewritten as:

$$\frac{r_2'}{\sqrt{r_2'^2 + (\omega_{S1}L_m')^2}} I_1 e^{j(\theta_2+\xi_1)} = \frac{r_2'}{\sqrt{r_2'^2 + (\omega_{S2}L_m')^2}} I_2 e^{j(\theta_2+\xi_2)},$$

where $\xi_1 \triangleq -\tan^{-1}\frac{\omega_{S1}L_m'}{r_2'}$ and $\xi_2 \triangleq -\tan^{-1}\frac{\omega_{S2}L_m'}{r_2'}$.

Therefore:

$$\omega_{S2} = \frac{2r_2'}{3PL_m'^2 I_0^2} T_2, \quad I_2 = \frac{\sqrt{r_2'^2 + (\omega_{S2}L_m')^2}}{r_2'} I_0, \text{ and}$$

$$\theta_2 = \theta_1 + \tan^{-1}\frac{\omega_{S2}L_m'}{r_2'} - \tan^{-1}\frac{\omega_{S1}L_m'}{r_2'}.$$

Figure 4:
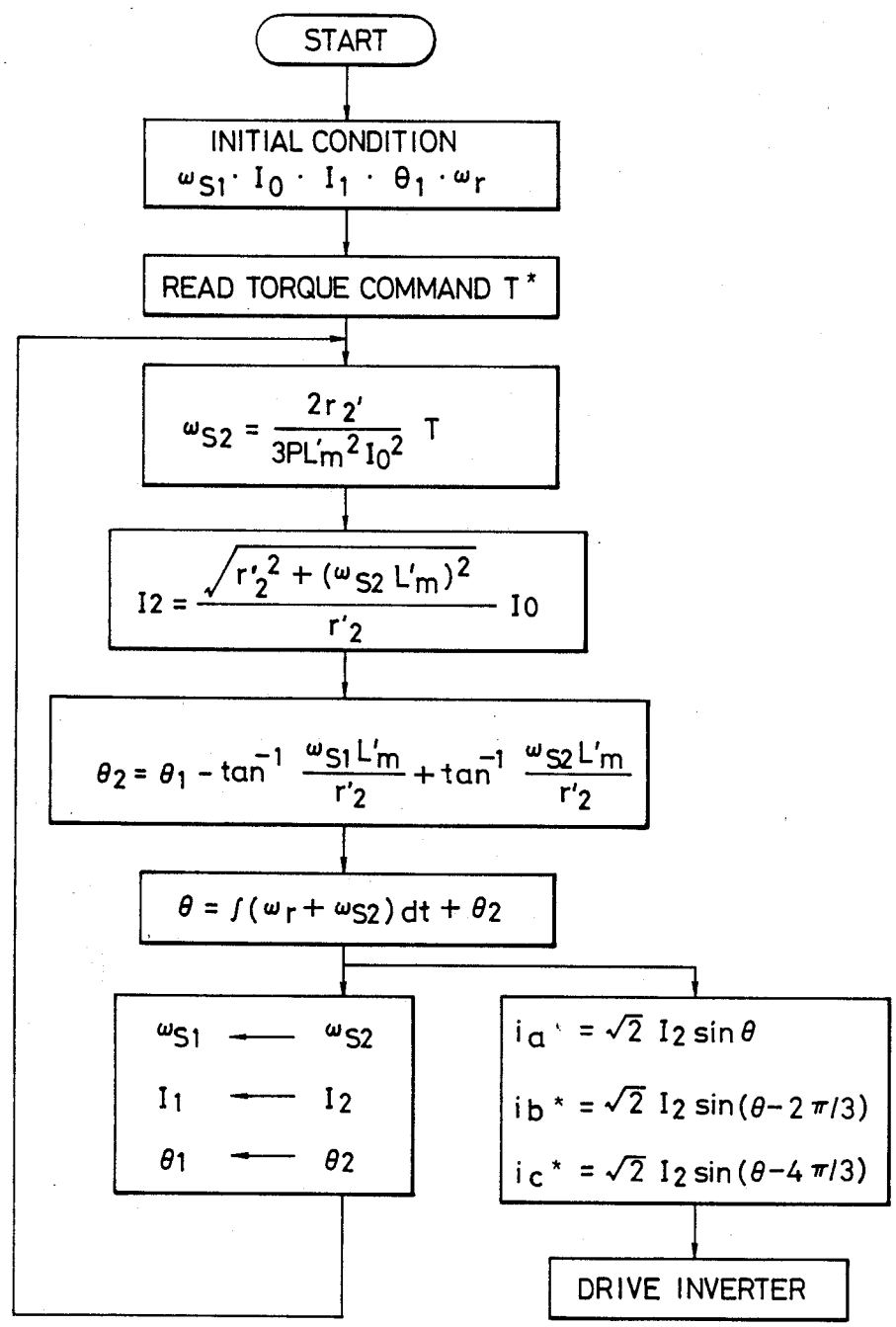
FIG. 4 shows a flow chart of a motor control method of the invention.

With $\omega_{S1}$, $I_1$, $\theta_1$ and $I_0$ given as initial conditions, a flow chart showing the application of the method of the invention to the control of an AC induction motor is shown in FIG. 4. The various steps of the flow chart are discussed in the Summary of the Invention above.

From the discussion above, it can easily be appreciated that the method of the invention does not require coordinate transformations as in the case of the field oriented method known in the prior art. No flux sensor is needed. Accordingly, the method of the invention can be implemented easily and economically. A microprocessor can be used to carry out the various calculations needed with the method of the invention.

Figure 6:
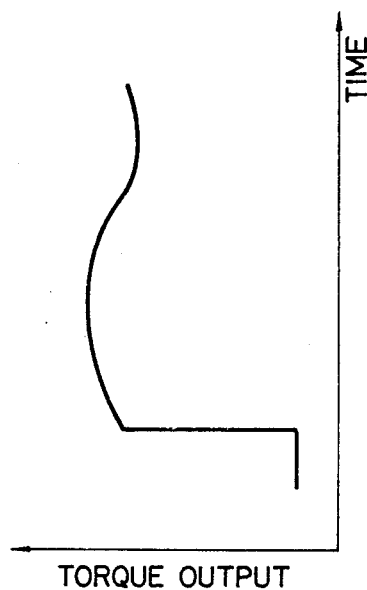
FIGS. 5 and 6 are diagrams showing showing, respectively, torque characteristics obtained with the invention and in a case where there is employed a different equivalent circuit than that on which the method of the invention is based.
Figure 5:
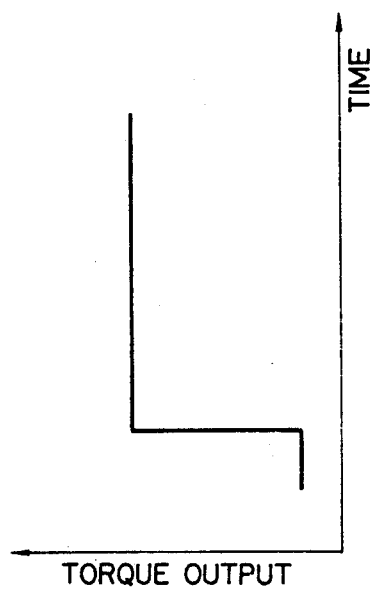
Figure 1:
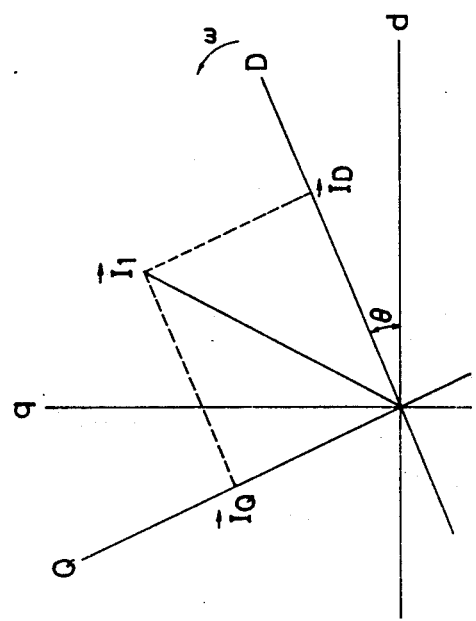
FIG. 1 is a diagram showing reference coordinate systems used in a prior art technique for controlling an AC induction motor.

FIGS. 5 and 6 show, respectively, the torque outputs of AC induction motors controlled with the method of the invention and using a similar control system but based upon a symmetrical-T type equivalent circuit. As can be seen from these graphs, with the method of the invention, when the input torque instruction is abruptly changed, the torque output responds substantially instantaneously, while the other method results in a considerable torque transient. The other equivalent circuits mentioned earlier produce results similar to the case of FIG. 6. Thus, the efficacy of the method of the invention is demonstrated.

This completes the description of the preferred embodiments of the invention. Although preferred embodiments have been described, it is believed that numerous modifications and alterations would be apparent thereto to one of ordinary skill in the art without departing from the spirit and scope of the invention.

I claim:

1. A method for controlling an AC induction motor in the manner of a DC motor through an inverter and in response to an input torque command, which AC induction motor is initially operating with conditions of a torque command of $T_1$, a slip frequency of $\omega_{S1}$, an exciting current of $I_0$, a stator current amplitude of $I_1$, a stator current angle of $\theta_1$, and a rotor angular speed of $\omega_r$, comprising the steps of:

(a) reading a new torque command $T_2$:

(b) computing a new rotor angular speed $\omega_{S2}$ as:

$$\omega_{S2} = \frac{2r_2'}{3PL_m'^2 I_0^2} T_2,$$

where $r_2' = x_m^2 \, r_2/x_2^2$, $r_2$ is the resistance of the rotor of the AC inductance motor, P indicates the number of pole pairs of the motor, and $L_m'$ is a magnetizing inductance of the motor defined by $j\omega L_m' = x_m' = x_m^2/x_2$, where $\omega$ is the angular frequency of the applied voltage, $x_m$ is the magnetizing reactance of the rotor, and $x_2$ is the self reactance of the rotor;

(c) computing a new stator current amplitude $I_2$ as:

$$I_2 = \frac{\sqrt{r_2'^2 + (\omega_{S2}L'_m)^2}}{r_2'^2} I_0;$$

(d) computing a new stator current angle $\theta_2$ as:

$$\theta_2 = \theta_1 + \tan^{-1}\frac{\omega_{S2}L'_m}{r_2'} - \tan^{-1}\frac{\omega_{S1}L'_m}{r_2'};$$

(e) computing a phase angle $\theta$ as:

$$\theta = (\omega_r + \omega_{S2})\Delta T + \theta_2,$$

where $\Delta T$ is a time interval from a time when the stator phase angle is $\theta_1$ until new current instruction values are applied to the inverter;

(f) computing the new current instruction values as:

$$i_a^* = \sqrt{2} I_2 \cdot \sin \theta,$$

$$i_b^* = \sqrt{2} I_2 \cdot \sin(\theta - 2\pi/3), \text{ and}$$

$$i_b^* = \sqrt{2} I_2 \cdot \sin(\theta - 4\pi/3); \text{ and}$$

(g) applying the new current instruction values to the inverter to drive the motor.

* * * * *